C. E. SMITH.
BEAN SORTING MACHINE.
APPLICATION FILED NOV. 1, 1912.

1,067,447.

Patented July 15, 1913.

WITNESSES:
Christine A. Braidel.
Roy Wallis.

INVENTOR
Charles E. Smith.
BY
Geo. B. Willcox. ATTORNEY

UNITED STATES PATENT OFFICE.

CHARLES E. SMITH, OF SAGINAW, MICHIGAN.

BEAN-SORTING MACHINE.

1,067,447.      Specification of Letters Patent.     Patented July 15, 1913.

Application filed November 1, 1912. Serial No. 729,126.

*To all whom it may concern:*

Be it known that I, CHARLES E. SMITH, a citizen of the United States, residing at Saginaw, in the county of Saginaw and State of Michigan, have invented certain new and useful Improvements in Bean-Sorting Machines; and I do hereby declare the following to be a full, clear, and exact description of the invention, such as will enable others skilled in the art to which it appertains to make and use the same.

This invention is a machine for sorting beans, peas, cranberries, huckleberries, or any seeds or berries that are inclined to roll. The objects of the invention are to provide a simple, inexpensive, yet efficient device for sorting out mis-shapen or defective seeds or fruits.

For the purpose of description I will describe the machine as applied to the sorting of beans.

The invention consists in the devices illustrated and claimed and the equivalents thereof.

Figure 2:
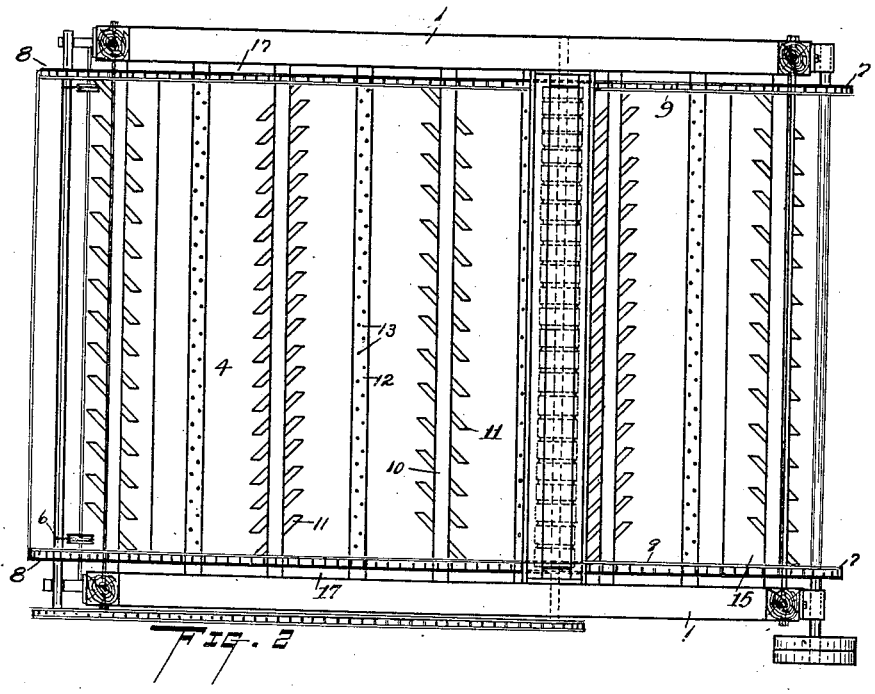
Figure 1:
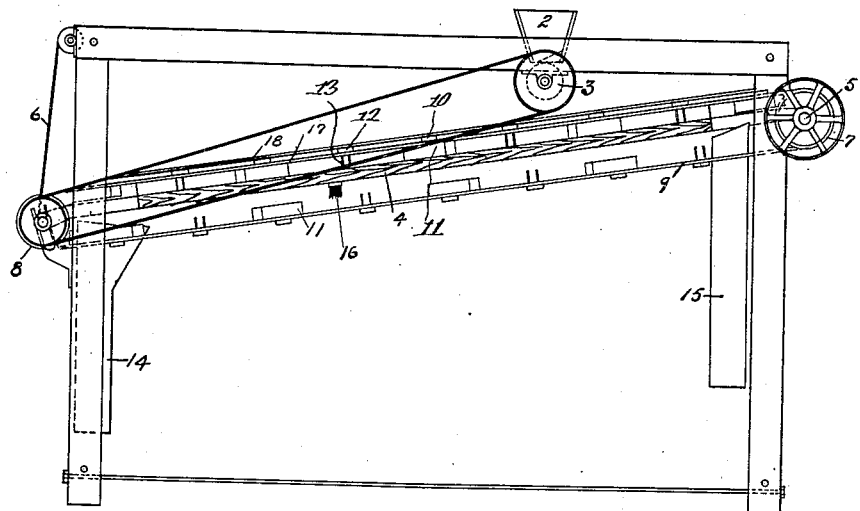

In the drawings, Figure 1 is a side view of such a machine; and Fig. 2 is a top plan view with the upper guide rail removed.

As is clearly shown in the drawings, the device consists in a frame 1 carrying a hopper 2 in which is located any suitable form of feeding device as the feed roll 3. Below the feed roll is a flat table or tray 4 preferably of wood, arranged at an incline, the upper end being pivoted at 5 to the frame of the machine and the lower end being vertically adjustable by means of a chain 6 or other device, whereby the inclination of the table may be varied to suit the material being sorted. Near the upper end of table 4 is mounted a pair of sprockets 7, and, carried by the lower end of the table, a pair of sprockets 8. A chain 9 connects one of the sprockets 7 with its corresponding sprocket 8, and the two parallel chains 9, 9 are connected at intervals by cross-bars 10, 10, these cross-bars carrying on their under sides sets of scraping blades 11 arranged at an angle of about 45° with the direction of travel of the bars 10. Successive bars 10 have their blades oppositely disposed as shown in Fig. 2. Between each pair of bars is a third bar 12 having downwardly projecting prongs or fingers 13. The scraping blades 11 and the prongs 13 travel upward along the table 4 as the material is fed from the hopper 2 onto the table. The more perfect beans roll down the table, passing in and out between the successive upwardly moving blades 11 and between the prongs 13, being only slightly retarded thereby and ultimately rolling off the bottom edge of the table 4 into a suitable chute 14, while the imperfectly shaped, rough, or split beans are carried up by the successive action of the upwardly traveling blades 11 and prongs 13 until they ultimately drop over the top edge of the table into a chute 15. The inclined blades agitate the beans and also work them toward the upper edge of the table. The prongs 13 agitate them and also spread them across the table. Preferably the rear ends of the blades of one set are staggered with reference to the front ends of the blades of the next succeeding set.

In case soft material is being handled, such as green peas, I provide means for cleaning the scraping blades 11 and the prongs 13 at each passage through the machine, this means consisting preferably of a suitable brush 16 extending across the machine from side to side beneath the table, and adapted to brush the blades and prongs as they pass.

To properly guide and support the cross-bars 10 and 12 as they pass over the upper surface of the table I provide a guide rail 17 upon which the projecting ends of the bars may slide, and to prevent the bars from lifting, a second guide rail 18 is placed above the first rail.

Having described my invention, what I claim and desire to secure by Letters Patent, is:—

1. In a sorting machine of the class described, the combination with a frame, of a hopper, feeding devices, an inclined table, cross-bars located above said table and extending from side to side; means for traversing said cross-bars up said table; angularly disposed scraping blades carried by said cross-bars, and means for actuating said cross-bars, for the purposes set forth.

2. In a sorting machine of the class described, the combination with a frame, of a hopper, feeding devices, an inclined table, cross-bars located above said table and extending from side to side; means for traversing said cross-bars up said table; angularly disposed sets of scraping blades carried by said cross-bars, the blades of successive sets being oppositely inclined; and means for actuating said cross-bars, for the purposes set forth.

3. In a sorting machine of the class described, the combination with a frame, of a hopper, feeding devices, an inclined table, cross-bars located above said table and extending from side to side, supporting guides for the ends of said bars, sprocket chains secured to the ends of said bars, sprockets, and means for actuating said sprockets; angularly disposed sets of scraping blades carried by certain of said bars; the blades of successive sets being inclined and staggered; downwardly extending prongs carried by intermediate bars; and means for varying the inclination of said table.

4. In a sorting machine of the class described, the combination with a frame, of a hopper, feeding devices, an inclined table pivotally supported at one end, means secured to the other end of said table for varying its inclination, cross-bars located above said table and extending from side to side; means for traversing said cross-bars up said table; angularly disposed scraping blades carried by said cross-bars, and means for actuating said cross-bars, for the purposes set forth.

5. In a sorting machine of the class described, the combination with a frame, of a hopper, feeding devices, an inclined table, cross-bars located above said table and extending from side to side; means for traversing said cross-bars up said table; angularly disposed sets of scraping blades carried by certain of said bars; the blades of successive sets being oppositely inclined, the rear ends of the blades of one set being staggered with reference to the front ends of the blades of the next succeeding set; and means for actuating said cross-bars.

6. In a sorting machine of the class described, the combination with a frame, feeding devices, an inclined table, cross-bars located above said table and extending from side to side; means for traversing said cross-bars up said table; angularly disposed sets of scraping blades carried by certain of said bars; and downwardly extending prongs carried by intermediate bars, for the purposes set forth.

In testimony whereof, I affix my signature in presence of two witnesses.

CHARLES E. SMITH.

Witnesses:
CHRISTINE A. BRAIDEL,
ROY WALLIS.

---

Copies of this patent may be obtained for five cents each, by addressing the "Commissioner of Patents Washington, D. C."